United States Patent [19]

Price et al.

[11] 4,111,709

[45] Sep. 5, 1978

[54] LUTE

[75] Inventors: David Watkin Price, Cheltenham; Newton John Hodges, Charlton Kings; Robert Furley, Gloucester, all of England

[73] Assignee: Coal Industry (Patents) Limited, London, England

[21] Appl. No.: 874,290

[22] Filed: Feb. 1, 1978

Related U.S. Application Data

[63] Continuation of Ser. No. 690,032, May 25, 1976, abandoned.

[30] Foreign Application Priority Data

Jul. 1, 1975 [GB] United Kingdom ............... 27711/75

[51] Int. Cl.$^2$ ............................................. C04B 33/00
[52] U.S. Cl. ....................................... 106/67; 202/269

[58] Field of Search ................... 106/40 R, 45, 71, 73, 106/67; 202/269; 264/30

[56] References Cited

U.S. PATENT DOCUMENTS

| | | | |
|---|---|---|---|
| 2,132,641 | 10/1938 | Otto | 202/269 |
| 2,526,289 | 10/1950 | Smith | 106/67 |
| 3,378,384 | 4/1968 | Stein | 106/67 |
| 3,536,503 | 10/1970 | Heidrich | 106/67 |
| 3,967,970 | 7/1976 | North | 106/40 R |

*Primary Examiner*—J. Poer
*Attorney, Agent, or Firm*—James C. Wray

[57] ABSTRACT

A lute for coke ovens and the like is of clay-like consistency and contains a blowing agent which produces gas at least within the temperature range 160° to 290° C, and can appreciably cut pollution.

5 Claims, No Drawings

LUTE

This is a continuation of application Ser. No. 690,032 filed May 25, 1976, now abandoned.

This invention concerns lute or daub used for the sealing of coke oven doors.

In coke ovens with doors not of the self-sealing type, an attempt is made to diminish the emission of polluting gas by the use of lute or daub as a seal. This lute is a mixture of shale, and/or coke breeze with a proportion of clay to give sufficient flexibility to enable the lute to be applied to the gap between the door frame and door with a trowel. Typically, lute is ground and mixed in a pug mill in 200 kg batches, containing 40 parts of colliery shale and 7 parts of fresh local clay, the parts often being shovelfulls, with sufficient water to yield about 25% by wt. in the final lute. A team of two men then apply the lute to the coke oven door using trowels; a 8 foot by 2 foot door requiring about 17 kg of lute, applied over 2½ to 3 minutes. The temperature of the lute rises to about 250° C. within 12 minutes, with a maximum temperature of approximately 400° C. As the lute dries, it shrinks linearly up to about 4%, thus the lute separates from the sides of the door and/or frame and also cracks appear across and along the length of the lute. To prevent ingress of air into the coke oven, which would cause serious damage, the oven is maintained at a pressure slightly above atmospheric, for example at a pressure of up to 6 to 7 mm, and normally about 1-4 mm, water gauge in the collecting main. Thus the gases from inside the oven can escape through the cracks in the lute yielding unpleasant and dangerous pollution, or the escaping gases can ignite causing door deformation. The problem of pollution is of major concern with the ever increasing awareness of environmental and worker protection.

Many attempts have been made to overcome this problem, but the only way seriously put forward has been "good housekeeping" in the maintenance and cleaning of coke oven doors and frames. Such maintenance and cleaning is frequently very difficult with coke ovens which are in continuous use with tight operating schedules and may be decades old.

The present invention provides a novel foamable lute which comprises a lute of clay-like consistency in admixture with a blowing agent which yields gas formation at least within the temperature range 160° to 290° C. Preferably the blowing agent yields gas formation in a temperature range within 140° to 240° C. The amount of blowing agent is suitably from 0.5 to 5% by wt. of the total lute, preferably about 1% by wt.

The blowing agent may be a mixture of one or more blowing agents. A particularly suitable blowing agent is a mixture of "Genitron" OB, blowing in the temperature range of 140° to 160° C., and "Genitron" AC2, blowing in the range of 190° to 220° C. These blowing agents may be admixed in amounts by weight of from 3:1 to 1:3, but conveniently a 1:1 ratio by wt. is used. "Genitron" blowing agents are marketed by Fiscons Industrial Chemicals, Cambridge.

It is understood that "Genitron" AC 2 is Azodicarbonamide(azobisformamide), and "Genitron" OB is p,p'-Oxy-bis(benzenesulphonhydrazide).

The water content of the lute is suitably from 20 to 30% by weight, and is preferably 23 to 27% by weight.

The lute may have its pH adjusted, for example to about 8, since alkaline lutes adhere better to the iron doors and frames of the coke ovens.

In addition to the clay which is normally used as a base for lute, other materials of clay-like consistency such as pressed colliery tailing, that is the firm filter cake from a froth flotation method of cleaning coal we envisaged.

It is clearly desirable that the blowing agent is distributed uniformly in the mix and also that the lute is fairly finely ground. A pug mill has been found satisfactory, but other mixers or mills such as ball mills may be used alternatively or in addition. Because the lute will normally comprise reclaimed lute recovered from the coke ovens and which may be contaminated with solid objects such as nuts and bolts, it is preferably to pass the lute after grinding and mixing through a screen, e.g. a ¼ inch screen.

Contrary to expectations, much of the lute remains wet whilst being heated until the lute reaches the temperature of approximately 250° to 290° C. Thus, surprisingly, the blowing agent is able to foam the lute to counteract the natural shrinkage and give slight expansion to improve the seal.

If the foamable lute is applied in conventional manner using trowels, visual observations indicate that pollution is cut by about 50%. Preferably, however, the foamable lute is applied using a special spraying gun as described in our copending Application No. 27712/75, whereby pollution is cut by about 75%.

Accordingly, this invention also provides a method of sealing a coke oven or like equipment such as furnaces or kilns, which method comprises applying to gaps in said oven or equipment a foamable lute as described above and permitting said lute to foam in situ.

Should there be any large leakage of pollution after the novel lute has foamed, further sealing may be effected using a supplementary daub. A preferred supplementary daub is a filled PVA daub, comprising for example 50 parts by wt. of a 7:3 mixture by weight of PVA latex and water, 40 parts by wt. of talc and 10 parts by wt. of asbestos fibres.

The present invention is illustrated by the following Example.

EXAMPLE

A lute was prepared by grinding and mixing in a pug mill, over 20 to 40 minutes, 40 parts by wt. of reclaimed lute, 7 parts by wt. of clay and sufficient of blowing agent to give 1% by wt. of the total lute, together with water to give a final water content by weight of 25%. The blowing agent was a 1:1 mixture by weight of "Genitron" OB and "Genitron" AC2.

This lute was applied to the gap between a coke oven door and the frame where it foamed whilst being heated, giving significantly better sealing than a non-foaming lute and cutting down pollution significantly.

We claim:

1. A foamable lute of clay-like consistency in admixture with a blowing agent which yields gas formation at least within the temperature range 160° to 290° C., said lute comprising an admixture of clay or pressed colliery tailings, water and at least one element selected from the group consisting of shale, coke breeze or reclaimed lute.

2. A foamable lute of clay-like consistency in admixture with a blowing agent which yields gas formation, said lute comprising an admixture of clay or pressed colliery tailings, water, and at least one element selected from the group consisting of shale, coke breeze, or reclaimed lute, wherein the blowing agent yields gas formation in a temperature range within 140° to 240° C.

3. A lute as claimed in claim 1, wherein the amount of blowing agent is from 0.5 to 5% by weight.

4. A lute as claimed in claim 3, wherein the amount of blowing agent is about 1% by weight.

5. A lute as claimed in claim 1, wherein the water content is from 23 to 27% by weight.

* * * * *